United States Patent
Kleinhans et al.

(10) Patent No.: US 8,960,610 B2
(45) Date of Patent: Feb. 24, 2015

(54) HIGH-LIFT SYSTEM OF AN AIRCRAFT

(75) Inventors: Reinhold Kleinhans, Grünenbach (DE); Stefan Huth, Lindenberg (DE); Werner Weiss, Scheidegg (DE); Bernd Schievelbusch, Lindenberg (DE)

(73) Assignee: Liebherr-Aerospace Lindenberg GmbH, Lindenberg/Allgäu (DE)

( * ) Notice: Subject to any disclaimer, the term of this patent is extended or adjusted under 35 U.S.C. 154(b) by 0 days.

(21) Appl. No.: 13/240,287

(22) Filed: Sep. 22, 2011

(65) Prior Publication Data
US 2012/0083345 A1 Apr. 5, 2012

(30) Foreign Application Priority Data
Sep. 30, 2010 (DE) .......................... 10 2010 047 154
Dec. 23, 2010 (DE) .......................... 10 2010 055 905

(51) Int. Cl.
*B64C 9/00* (2006.01)
*C22C 13/00* (2006.01)
*F16C 3/02* (2006.01)
*B64C 13/28* (2006.01)
*B64C 13/38* (2006.01)

(52) U.S. Cl.
CPC .............. *B64C 13/28* (2013.01); *B64C 13/38* (2013.01); *Y10S 464/902* (2013.01)
USPC ............ 244/213; 464/182; 464/902; 420/420

(58) Field of Classification Search
USPC ........... 464/179, 182, 902; 420/420; 148/421, 148/669; 72/214, 220; 244/213
See application file for complete search history.

(56) References Cited

U.S. PATENT DOCUMENTS 4,898,624 A * 2/1990 Chakrabarti et al. ......... 420/420
6,672,540 B1 1/2004 Shaheen et al.
2008/0001037 A1 1/2008 Cox et al.
2009/0146015 A1* 6/2009 Schievelbusch
2010/0001674 A1 1/2010 Hauzenberger et al.

FOREIGN PATENT DOCUMENTS

| CN | 1934562 A | 3/2007 |
| CN | 101239655 A | 8/2008 |
| CN | 101346276 A | 1/2009 |
| DE | 10 2004 055 740 A1 | 1/2006 |
| DE | 102008019372 A2 | 10/2009 |
| DE | 10 2010 047 540 A1 | 4/2012 |
| EP | 1604896 A2 | 12/2005 |
| EP | 2008931 A2 | 12/2008 |
| EP | 2 039 605 A2 | 3/2009 |
| EP | 2154488 | 2/2010 |

OTHER PUBLICATIONS

Strehlau, "Introducing cold pilger mill technology," The Tube and Pipe Journal, Jul. 1, 2006. [online], [retrieved on Jan. 2, 2013]. Retrieved from the Internet <URL: http://www.thefabricator.com/article/tubepipeproduction/introducing-cold-pilger-mill-technology>.*
"Shaft Design." RoyMech. Sep. 19, 2009, [online], [retrieved on Dec. 17, 2013] Retrieved from the Internet <URL: http://web.archive.org/web/20090919233028/http://www.roymech.co.uk/Useful_Tables/Drive/Shaft_design.html>.*
"Flange." Dictionary.com. [online], [retrieved on May 20, 2014] Retrieved from the Internet <URL: http://dictionary.reference.com/browse/flange>.*
German Search Report dated Nov. 20, 2012.

* cited by examiner

*Primary Examiner* — Gregory Binda
*Assistant Examiner* — Josh Skroupa
(74) *Attorney, Agent, or Firm* — Dilworth & Barrese, LLP.

(57) ABSTRACT

A high-lift system of an aircraft has at least one drive unit, at least one load station as well as one or more transmissions for transmitting the drive energy of the drive unit to the at least one load station. One or more of the transmissions are made as transmission shafts from a material containing titanium or include a material containing titanium.

27 Claims, 2 Drawing Sheets

HIGH-LIFT SYSTEM OF AN AIRCRAFT

BACKGROUND OF THE INVENTION

The invention relates to a high-lift system of an aircraft having at least one drive unit, having at least one load station as well as having one or more transmissions for transmitting the drive energy of the drive unit to the at least one load station.

Aircraft high-lift systems are known from the prior art which have a central drive unit which is in communication with a branch drive for the two wing halves.

FIG. 3 shows such a known high-lift system in the form of the transmission of the right wing in which the transmission in accordance with the invention may be used, for example.

The drive unit 10 designed, for example, as a hydraulic motor or DC motor is in communication with the transmissions of both wings via the branch drive 20. The system load limiter 50, which can also be omitted or is not absolutely necessary in the inventive embodiment of the transmission shafts made of a material containing titanium is located between the high load transmission 30 and the low load transmission 40 of the wing.

The reference symbols 60 designate the load stations of the flaps or the like. The reference symbol 62 designates the transmission brake.

If a seizure occurs in the system, for example at the load stations 60 of the flaps, the load of the transmission of the respective wing then increases until the system load limiter 50 prevents a further load increase of the low load transmission 40.

High-lift systems are furthermore known from the prior art which have a security against overload with an electric overload sensor which is arranged in the drive train between the drive unit and at least one load station. Provision can be made in this respect that for the event that a system seizure occurs, a reverse operation of the drive unit it initiated, whereby the load in the transmission can be rapidly reduced.

Reference is made in this respect to DE 10 2004 055 740 A1 whose disclosure content is herewith made the subject of the present invention.

SUMMARY OF THE INVENTION

It is the underlying object of the present invention to further develop a high-lift system of the initially named kind in an advantageous manner.

This object is satisfied by a high-lift system having the features herein.

Provision is accordingly made that one or more of the transmissions are made as transmission shafts which consist of a material containing titanium or comprise a material containing titanium. Not only the advantage of a weight-optimized system architecture can be achieved by the use of a material containing titanium, but also the advantage that a comparatively shallow torque/angle of rotation characteristic can be obtained. The use of a torsionally soft material brings along the advantage that in the time window required for the regulation, a corresponding counter-regulation can be set up.

The at least one transmission shaft is preferably made as a torsion spring containing Ti.

Provision is preferably made that the material has a preferably linear torque characteristic which is not too steep, i.e. is made torsionally soft, in a large elastic range.

Provision is furthermore advantageously made that the material has sufficient strength properties (preferably Rm>1000 Mpa). Know solutions with the goal of a low weight are transmission shafts made of aluminum and CFRP. They, however, have the disadvantage that they are either not sufficiently torsionally soft and/or do not have sufficient bending resistance.

In a preferred embodiment of the present invention, provision is furthermore made that the material has, additionally or alternatively to the feature of the above-named tensile strength which results in a larger working range, the property that the elongation at break amounts to >8%. The elongation at break is a characteristic for the deformation capability of the material and corresponds to the quotient from the length change of the tension bar to the starting length. The aforesaid properties are preferably mechanical properties of the material at room temperature.

Provision can furthermore be made that the material of the transmission shaft has a Young's modulus at room temperature in the range between 100 GPa and 120 GPa, and preferably of 110 GPa. The shear modulus, which is in relation with Young's modulus E and the transverse contraction number·v (Poisson number) via the relationship $G=E/(2+2v)$, is preferably in the range in the material in accordance with the invention from 39 GPa to 42 GPa, preferably at a value of approximately 40 GPa. If the value 0.36 for titanium is set for v, the particularly preferred value of G results at a level of 40.44 GPa.

The named values for Young's modulus and the shear modulus also preferably relate to the values at room temperature.

Provision is made in a preferred embodiment of the invention that the material is an alloy containing titanium. The use of an $\alpha$-$\beta$ titanium alloy is conceivable. This is preferably annealed, cold-drawn and stress-relieved with respect to the thermal treatment state.

It is particularly advantageous if the material contains titanium as the main component.

The material can comprise further components, in particular aluminum and/or vanadium, in addition to titanium. Provision is preferably made in this respect that the aluminum portion is larger than the portion of vanadium in the alloy.

In addition to titanium, aluminum and vanadium, further components such as iron, yttrium, etc. can also be present.

Provision is preferably made that the aluminum is present in a range from 4.5% by weight to 7.5% by weight, and preferably in a range from 5.5% by weight to 6.5% by weight.

The vanadium portion is preferably in a range from, for example, 2.5% by weight to 5.5% by weight, and preferably in a range from 3.5% by weight to 4.5% by weight.

The use of the material Ti 6Al 4V has proved particularly advantageous.

Provision is made in a further embodiment of the invention that the transmission shaft is in communication with one or more connector elements, with provision preferably being made that the connector element or elements consist(s) of a material containing titanium or comprise(s) such a material.

The connection between the connector elements and the transmission shaft can preferably be manufactured by a welding process.

A homogenous, welded component is preferably used comprising a transmission shaft consisting of a pipe having the named highly strong, easily weldable titanium alloy in conjunction with different types of light and highly strong titanium connector elements.

These connector elements can, for example, be forks for integrated gimbal joints or flanges for releasable connections and integrated toothed elements.

The connector element(s) can consist of the same material as the actual transmission shaft.

The connection between the connector element or elements and the pipe of the shaft can take place, for example, by orbital TIG welding without additional material for the connection of shaft-connector element with a special weld seam preparation.

Provision is made in a further embodiment of the invention that the high-lift system has means for load measurement (force or torque), in particular means for electric load measurement. It is conceivable that the high-lift system has a security against overload which has at least one electric overload sensor which is arranged at a suitable point in the drive train between the drive unit and at least one load station.

It is conceivable that a regulation or control element is provided which is in communication with the means for load measurement as well as with the drive unit and has the means by which an electric signal is output to the drive unit on taking up a load exceeding the limit value. It is conceivable that this signal results in a stopping or a braking of the drive unit. It is particularly advantageous if the signal results in a reverse operation of the drive unit so that the drive energy is reduced very fast.

The use of the shafts in accordance with the invention is, however, not restricted to such a system.

The shafts can equally be used in high-lift systems which, for example, have a conventional system load limiter. Load peaks can be avoided overall due to the torsionally soft design of the shaft, whereby a system design is possible which weighs less and is less expensive. The use is conceivable for unregulated systems with the increase of the proportion of elastic components of the transmission shaft.

These conventional system load limiters can be understood as unregulated systems. The conventional system load limiter is preferably a component which leads off an overload into the aircraft structure and protects the low load transmission in this manner. The use of mechanically working system load limiters is conceivable, for example. A spring-biased ball ramp mechanism is conventional which actuates a further mechanism in the event of an overload which leads off the overload into the aircraft structure and protects the low load transmission in this manner.

The present invention furthermore relates to the use of a transmission or transmission shaft in accordance with the invention for a high-lift system of an aircraft.

The invention finally relates to a method for manufacturing at least one transmission shaft, preferably a transmission shaft of a high-lift system, which is characterized in that the transmission shaft is manufactured by the pilger process, also called the pilger step process. The positive mechanical properties of the material can be achieved particularly advantageously by this process.

The present invention furthermore relates to an aircraft having at least one high-lift system.

BRIEF DESCRIPTION OF THE DRAWINGS

Further details and advantages of the invention will be explained in more detail with reference to an embodiment shown in the drawing. There are shown:

FIG. 1: a sectional view through a transmission shaft in accordance with the invention with connector elements welded on;

DESCRIPTION OF THE PREFERRED EMBODIMENTS

Figure 1:
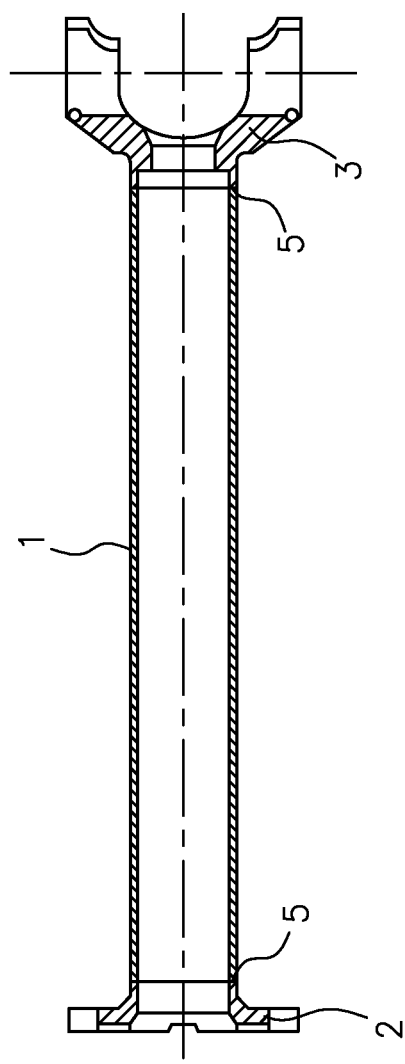

FIG. 1 shows a transmission shaft having the reference numeral 1 which comprises the material Ti 6 Al 4V. It is set forth by way of example in the following table which composition the titanium alloy used for the transmission shaft has.

| Element | Massenantell in % (Percentage by mass) | |
|---|---|---|
| (Elements) | Von (from) | Bis (to) |
| Aluminium (Al) | 6.50 | 6.50 |
| Vanadium (V) | 3.50 | 4.50 |
| Iron (Fe) | — | 0.25 |
| Oxygen (O) | — | 0.15 |
| Nitrogen (N) | — | 0.05 |
| Carbon (C) | — | 0.08 |
| Hydrogen (H) | — | 0.0125 |
| Yttrium (Y) | — | 0.005 |
| Andere, sonstige (others, each) | — | 0.1 |
| Andere, gesumt (others, total) | — | 0.3 |
| Ti | Rest (Remainder) | |

Figure 2:
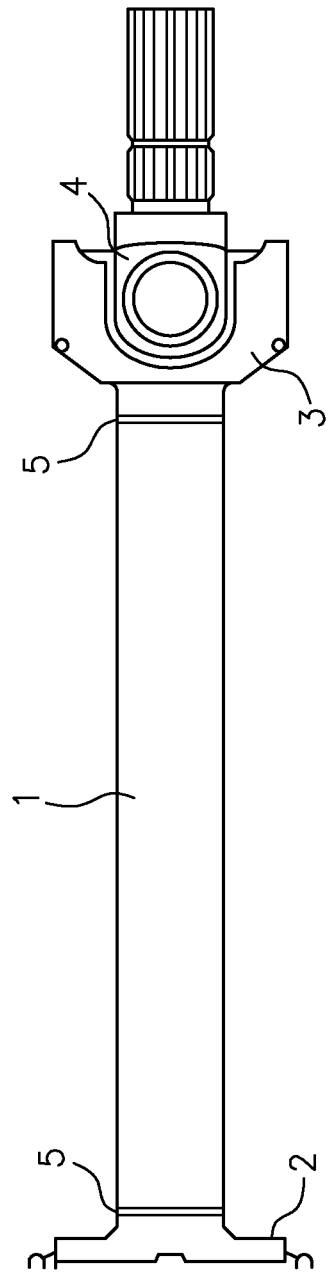
FIG. 2: a plan view of the transmission shaft in accordance with FIG. 1 with an integrated gimbal joint.

As can further be seen from FIG. 1, the shaft 1 is provided with two connector elements 2, 3, with the connector element 2 being a flange for a releasable connection and the element 3 being a fork for an integrated gimbal joint 4 which is shown in the view in accordance with FIG. 2.

The connector elements 2, 3 shown are naturally only examples. Other elements can also be used as required.

The connector elements 2, 3 also preferably contain titanium. It is conceivable to manufacture them from the same material as the actual transmission shaft 1. The connector elements 2, 3 are welded to the pipe 1 at the points 5.

In accordance with FIG. 1, a homogenous welded component in the shape of the transmission shaft 1 results overall which comprises the named titanium alloy and which is provided in the embodiment shown in each case at the end side with a light and highly strong titanium connector element 2, 3.

An advantage of the present invention is that the transmission shaft does not require any surface protection and that the connector elements 2, 3 are made from a construction aspect such that no filler metal is required.

This simplifies the connection of the transmission shaft 1 to the connector elements 2, 3.

It is conceivable to carry out the connection between the pipe or transmission shaft 1 and the connector elements 2, 3 by welding and preferably by orbital TIG welding (electrode rotates). As stated, an advantageous embodiment comprises that welding takes place without welding material.

The transmission shaft 1 has the advantage that it has a linear and comparatively shallow torque characteristic in a large elastic range, i.e. is made torsionally soft.

Such an embodiment is in particular advantageous for the above-described regulation, which can result in a reverse operation of the drive unit to reduce the torque as fast as possible, since a sufficiently large time window is provided by the torsionally soft design of the shaft to be able to set up the corresponding counter-regulation or the reverse operation of the drive unit.

Figure 3:
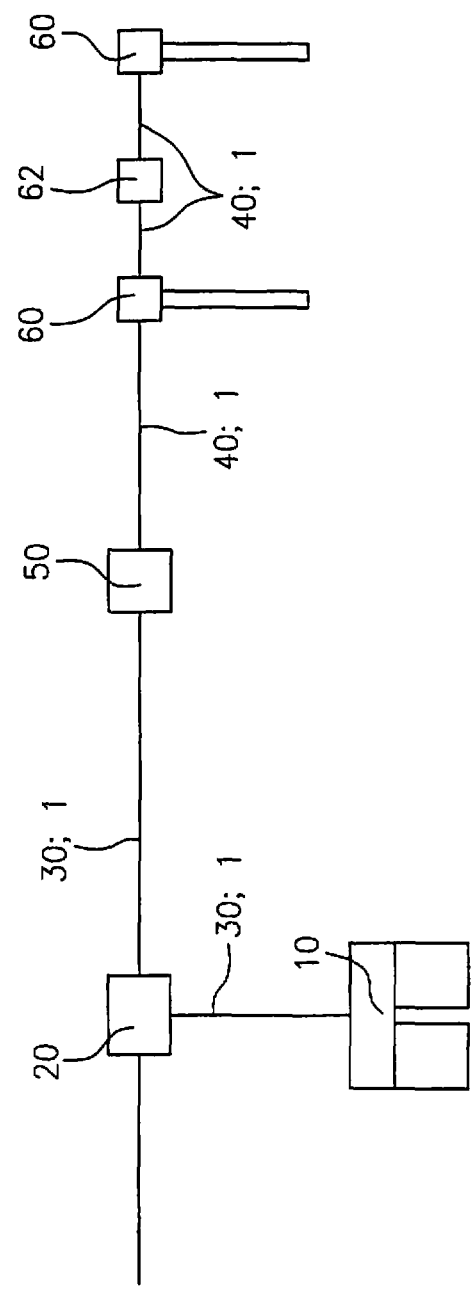
FIG. 3: a schematic view of an aircraft high-lift system in accordance with the prior art.

As likewise stated above, the transmission shaft is, however, not restricted to such a use, but can rather also be used, for example, in systems such as shown, for example, in FIG. 3, i.e. in conventional high-lift systems which have a conventional system load limiter, for example. In this case, the use of the torsionally soft pipe results in the avoidance of load peaks and thus overall allows a design of the total load-optimized high-lift system which weighs less.

The arrangements shown in FIGS. 1 and 2 can extend in the total section, i.e. from the drive unit 10 up to the load stations 60. This means that the transmission shafts in accordance with the invention can be used in the high load transmission 30 and/or in the low load transmission 40. The system preferably comprises one or more transmission shafts in accordance with the invention in a throughgoing manner, i.e. from the drive unit 10 up to the load stations 60.

It is, however, also conceivable and covered by the invention that only a part section of the total transmission from the drive unit to the load station(s) 60 or the total transmission is formed by the transmission shaft in accordance with the invention. It is thus, for example, conceivable to design the drive train from the drive unit 10 up to the branch drive 20 or up to the system load limiter 50 or up to the load stations 60 or the section between the branch drives 20 and the system load limiter 50 and/or the section between the system load limiter 50 and the load stations with the transmissions in accordance with the invention.

The load stations 60 preferably serve the movement of the wing flaps or landing flap systems/slat flap systems.

The following optimized properties can be achieved in a preferred embodiment of the invention by the transmission shaft in accordance with the invention.
a) shallow torsion/spring characteristic by a special alloy in accordance with the invention;
b) a high resilience and a high tensile strength $R_m$ of >1000 MPa which is in particular achieved by the pilger manufacturing process; and
c) a system design which weighs comparatively less due to the torsionally soft design of the shaft by which load peaks can be avoided.

The invention claimed is:

1. A high-lift system of an aircraft having
at least one drive unit, having
at least one load station as well as having
one or more transmissions for transmitting the drive energy of the drive unit to the at least one load station, wherein
one or more of the transmissions are made as transmission shafts which comprise a material containing titanium and having a Young's modulus in the region of 100 to 120 GPa and/or a shear modulus in the range from 39 GPa to 42 Gpa, and
the transmission shaft (1) is provided with two connector elements (2, 3) on opposite ends thereof, with one connector element (2) in the shape of a flange for releasable connection and the other connector element (3) in the shape of a fork for an integrated gimbal joint (4).

2. A high-lift system in accordance with claim 1, wherein the material comprises, in addition to titanium, only or inter alia aluminum and/or vanadium as further components, with provision preferably being made that both aluminum and vanadium are present and aluminum is present in a larger mass portion than vanadium.

3. A high-lift system in accordance with claim 2, wherein aluminum is present in a range from 4.5% by weight to 7.5% by weight and preferably in a range from 5.5% by weight to 6.5% by weight.

4. A high-lift system in accordance with claim 2, wherein vanadium is present in a range from 0.5% by weight to 5.5% by weight and preferably in a range from 3.5% by weight to 4.5% by weight.

5. A high-lift system in accordance with claim 1, wherein the material is the alloy Ti 6Al 4V.

6. A high-lift system in accordance with claim 1, wherein the material has a tensile strength $R_m$ of >1000 N/qmm and/or an elongation at break of >8%.

7. A high-lift system in accordance with claim 1, wherein the two connector elements (2, 3) each comprise a material containing titanium.

8. A high-lift system in accordance with claim 7, wherein the two connector elements (2, 3) each consists of the material.

9. A high-lift system in accordance with claim 1, wherein the two connector elements (2, 3) are welded (5) to the transmission shaft (1).

10. A high-lift system of an aircraft having
at least one drive unit,
at least one load station, and
one or more transmissions for transmitting the drive energy of the drive unit to the at least one load station, wherein
one or more of the transmissions are made as transmission shafts which comprise a material containing titanium and having a Young's modulus in the region of 100 to 120 GPa and/or a shear modulus in the range from 39 GPa to 42 GPa, and
the transmission shaft (1) is provided with two connector elements (2, 3) on opposite ends thereof, with one connector element (2) in the shape of a flange for releasable connection and the other connector element (3) having external teeth.

11. A high-lift system in accordance with claim 10, wherein the two connector elements (2, 3) each comprise a material containing titanium.

12. A high-lift system in accordance with claim 10, wherein the two connector elements (2, 3) each consists of the material.

13. A high-lift system in accordance with claim 10, wherein the two connector elements (2, 3) are welded (5) to the transmission shaft (1).

14. A high-lift system in accordance with claim 10, wherein the material comprises, in addition to titanium, only or inter alia aluminum and/or vanadium as further components, with provision preferably being made that both aluminum and vanadium are present and aluminum is present in a larger mass portion than vanadium.

15. A high-lift system in accordance with claim 14, wherein aluminum is present in a range from 4.5% by weight to 7.6% by weight and preferably in a range from 5.5% by weight to 6.5% by weight.

16. A high-lift system in accordance with claim 14, wherein vanadium is present in a range from 2.5% by weight to 5.5% by weight and preferably in a range from 3.5% by weight to 4.5% by weight.

17. A high-lift system in accordance with claim 10, wherein the material is the alloy Ti 6Al 4V.

18. A high-lift system in accordance with claim 10, wherein the material has a tensile strength $R_m$ of >1000 N/qmm and/or an elongation at break of >8%.

19. A high-lift system of an aircraft having
at least one drive unit,
at least one load station, and
one or more transmissions for transmitting the drive energy of the drive unit to the at least one load station, wherein
one or more of the transmissions are made as transmission shafts which comprise a material containing titanium and having a Young's modulus in the region of 100 to 120 GPa and/or a shear modulus in the range from 39 GPa to 42 GPa, and the transmission shaft (1) is provided with two connector elements (2, 3) on opposite ends thereof and both in the shape of flanges.

20. A high-lift system in accordance with claim 19, wherein the two connector elements (2, 3) each comprise a material containing titanium.

21. A high-lift system in accordance with claim 20, wherein the two connector elements (2, 3) each consists of the material.

22. A high-lift system in accordance with claim 19, wherein the two connector elements (2, 3) are welded (5) to the transmission shaft (1).

23. A high-lift system in accordance with claim 19, wherein the material comprises, in addition to titanium, only or inter alia aluminum and/or vanadium as further components, with provision preferably being made that both aluminum and vanadium are present and aluminum is present in a larger mass portion than vanadium.

24. A high-lift system in accordance with claim 23, wherein aluminum is present in a range from 4.5% by weight to 7.5% by weight and preferably in a range from 5.5% by weight to 6.5% by weight.

25. A high-lift system in accordance with claim 23, wherein vanadium is present in a range from 2.5% by weight to 5.5% by weight and preferably in a range from 3.5% by weight to 4.5% by weight.

26. A high-lift system in accordance with claim 19, wherein the material is the alloy Ti 6Al 4V.

27. A high-lift system in accordance with claim 19, wherein the material has a tensile strength $R_m$ of >1000 N/qmm and/or an elongation at break of >8%.

* * * * *